United States Patent Office 3,627,508
Patented Dec. 14, 1971

3,627,508
PROCESS OF BENEFICIATION
William Hughes, Norton, and Frank Ronald Williams, Norton, Stockton-on-Tees, England, assignors to British Titan Products Limited, Billingham, England
No Drawing. Filed July 22, 1969, Ser. No. 843,833
Claims priority, application Great Britain, Aug. 14, 1968, 38,811/68
Int. Cl. C01g 23/04; C22b 1/08
U.S. Cl. 75—1                                                                 14 Claims

ABSTRACT OF THE DISCLOSURE

Beneficiation of a titaniferous ore in which the iron oxide present in the ore is reduced to a form such that it can be removed by leaching, for example, with a dilute acid and after leaching, chlorinating the ore under such conditions that any remaining iron and other chlorinatable impurities are converted to volatile chlorides without chlorinating to any substantial extent the titanium dioxide in the ore. The volatile chlorides are removed from the treated ore to produce an enriched ore having the characteristics of naturally occurring mineral rutile.

---

This invention relates to a process of beneficiation of a titaniferous ore.

One method for the production of pigmentary titanium dioxide in current use involves the vapour phase oxidation of titanium tetrachloride. This titanium tetrachloride is produced by the chlorination of a titanium-bearing ore, usually mineral rutile which contains a high proportion, for example at least 95% up to 98% by weight of titanium dioxide with a small amount of iron oxide and other impurities.

Much of the world's resources of titaniferous ores are in forms which contain a substantial proportion of iron oxide and other impurities. For example, the titanium dioxide content of an ilmenite can be 40% by weight or lower and if such products are to be used for the production of titanium tetrachloride it is usually necessary to increase the proportion of titanium dioxide content in the ore.

Existing methods of beneficiation of such ores produce an increasing proportion by weight of titanium dioxide but also increase the proportion of non-iron impurities which is disadvantageous.

It would be advantageous if a process for beneficiation of a titaniferous ore could be used which produces an ore at least equivalent to the existing mineral rutile which may be used directly in the chlorination stage for the production of titanium tetrachloride.

According to the present invention a process for the beneficiation of a titaniferous ore containing a substantial quantity of combined iron present as iron oxide comprises reducing the iron oxide of the ore to a reduced form capable of being removed by leaching, leaching the treated ore to remove reduced iron oxide, treating the reduced ore at an elevated temperature with chlorine gas under such conditions that the remaining iron and other chlorinatable impurities are converted to volatile chlorides without substantially chlorinating titanium dioxide in the ore and removing the volatile chlorides so produced from the treated ore.

Preferably the process of the present invention is operated such that the treated ore, after reduction of the iron and leaching, contains from 85% to 95% by weight of titanium calculated as titanium dioxide which, after being subjected to chlorination under such conditions that impurities are chlorinated but the titanium dioxide content is substantially non-chlorinated, has a titanium content calculated as titanium dioxide of from 94% to 99% by weight.

The titaniferous ore treated according to the present invention can be any suitable ore but is preferably a weathered ilmenite such as leucoxene. The material may be initially in a massive form in which case it will require grinding but in the weathered form it will usually be in the form of a sand in which the proportion of iron has already been reduced by natural means relative to that found in the massive form. The weathered forms of ilmenite are found as beach deposits in many parts of the world. The weathered form is commonly already of such a particle size that it requires no further grinding before being treated with the reducing agent. It is preferred, whatever the form of the starting material, to subject it to a process of preliminary mechanical beneficiation (including magnetic and/or electrostatic methods) to remove impurities not containing titanium.

Generally the titaniferous ore to be treated in accordance with the present invention will have the following general composition:

|                                                           | Percent by weight |
|-----------------------------------------------------------|-------------------|
| $TiO_2$                                                   | 30–85             |
| Total iron (as oxide)                                     | 10–65             |
| Silicon, aluminium, magnesium, manganese, etc. oxides     | Balance           |

More usually the ores to be treated will contain from 40% to 70% by weight of $TiO_2$ and from 15% to 50% by weight of iron as the oxide.

Any method can be employed for the reduction of iron oxide according to the process of the invention. For instance, the crude ore can be mixed with the reducing agent and heated in, for example, a furnace until a substantial quantity of the iron oxide has been reduced to removable form. The reduction can be effected by heating the ore in the presence of a solid reducing agent such as carbon, for example, as provided by charcoal, coke or brown coal or, alternatively, the reduction can be carried out by heating the ore in the presence of a reducing gas, for example, hydrogen or carbon monoxide. The temperature of reduction will usually be from 800° C. to 1,300° C. (depending on the reducing agent) and conveniently the ore may be formed into pellets, mixed with the reducing agent (if a solid) and heated in a rotary furnace. By this method of reduction, it is possible to reduce from 85% to 95%, more usually about 90% by weight, of the iron oxide.

The reduction of iron oxide in according to the process of the present invention can also be carried out by a method as described in our U.S. specification No. 3,149,963. In this specification there is described and claimed a process for treating an iron-containing titaniferous material which comprises sulphiding such material in a titaniferous state at an elevated temperature in the presence of oxygen. The oxygen may be used alone or in a mixture containing it, e.g. air. This sulphiding treatment converts iron impurities into iron sulphide which can then be removed by leachng with a dilute mineral acid, for example sulphuric acid as described later. A method of operating the invention according to our specification No. 3,149,963 is to maintain the ore to be treated in a fluidised bed and to pass sulphur vapour and oxygen through the bed whilst maintaining the bed at an elevated temperature, for example 600° C. to 900° C. The heat produced by the burning of the sulphur in the oxygen may be sufficient to maintain the temperature of the bed at the required level without additional heating. Alternatively, a source of sulphur such as elemental sulphur can be introduced with the material to be treated into the fluidised bed and a stream of oxidising gas passed through the bed to promote the reaction between the sulphur and the iron oxide to reduce the iron oxide to the iron sulphide.

The reduced ore containing the titanium dioxide in an unchanged form is subjected to a leaching step in which the iron is removed. Usually the reduced ore will be treated with an aqueous solution of a leaching agent, e.g. an acid which can be a mineral acid, e.g. sulphuric acid or an organic acid such as acetic acid. It is convenient to use for this purpose dilute sulphuric acid obtained as a by-product from the sulphate process for the production of pigmentary titanium dioxide.

The leaching is usually effected at an elevated temperature, for example under reflux. By this means the reduced iron is converted to a soluble form and removed from the ore concentrate obtained. Typically, after leaching, the ore will contain from 85% to 95% by weight of titanium calculated as titanium dioxide and from 10% to 3% by weight of iron which may be present as the oxide.

The leached ore is then subjected to chlorination with chlorine gas at an elevated temperature under conditions such that substantially the whole of the remaining iron content is chlorinated and volatilised as iron chloride together with a substantial proportion of the other impurities commonly present in the leached ore. This process can be effected in a continuous manner in, for example, a fluid bed in which the bed of the leached ore is maintained in a fluidised condition by the passage through the bed of the chlorine gas and ore from which impurities have been chlorinated is withdrawn continuously from the bed whilst untreated leached ore is added thereto. The chlorination of the ore is carried out in the presence of a reducing agent such as a source of carbon, e.g. coke, preferably in excess of the stoichiometric equivalent of the metal oxides present in the leached ore other than titanium dioxide.

The chlorination of the leached ore is carried out for such a time that there is sufficient iron remaining in the chlorinated material to react with any small amount of titanium tetrachloride which may be formed in this stage to convert this to titanium dioxide and thereby prevent the loss of the titanium dioxide from the chlorinated ore. Normally, it is found that after chlorination, the ore still should contain from 0.2% to 1% of iron as iron oxide to effect this.

The leached ore, prior to chlorination, will normally also contain niobium, aluminium, magnesium, manganese, silicon, vanadium, chromium and phosphorous compounds and it is found that on chlorination substantially the whole of the manganese and magnesium are removed in addition to the iron and that vanadium and chromium are at least partially removed.

The temperature at which the leached ore is maintained during chlorination will usually be at least 800° C. and preferably will be in the range 800° C. to 1,100° C.

The ore can have a particle size range of between 40μ and 1,000μ, preferably between 80μ and 400μ. Where necessary the ore obtained at the end of leaching should be ground so that its particle size is suitable for chlorination.

Where the chlorination process is operated continuously, then usually the mixture of the reducing agent and leached ore will be added to the reactor in which the chlorination stage is to be effected. The waste gases produced on chlorination can be cooled to condense the volatile chlorides into solids and separated by any suitable means such as a cyclone.

The process according to the present invention produces a beneficiated ore containing a high proportion of titanium dioxide with a small amount of iron and other impurities which is eminently suitable for use in the production of titanium tetrachloride for use in the vapour phase oxidation process for the manufacture of pigmentary titanium dioxide, for example by chlorination of the material in a fluid bed in the presence of carbon. In many instances the product of the beneficiation process according to the invention is superior to naturally occurring mineral rutile which is conventionally used in the production of titanium tetrachloride and accordingly less complicated impurity separation apparatus and processes need be employed than would otherwise be necessary to eliminate impurities from titanium tetrachloride produced for use in the vapour phase oxidation process.

The invention is illustrated in the following examples:

EXAMPLE 1

Norwegian ilmenite was mixed with 9.37% of its weight of sodium chloride and about 9% of its weight of water and trundled in a rotating drum until pellets having a size of from 5 to 10 millimetres in diameter were formed. The pellets were then dried.

The Norwegian ilmenite pelletised by this operation had an average particle size of 250μ and had the following typical main analysis:

|   | Percent by weight |
|---|---|
| $TiO_2$ | 44.00 |
| Iron (as FeO) | 35.00 |
| Iron (as $Fe_2O_3$) | 13.00 |
| Silicon (as $SiO_2$) | 1.50 |
| Aluminium (as $Al_2O_3$) | 1.00 |
| Magnesium (as MgO) | 3.20 |
| Manganese (as MnO) | 0.33 |

The pelletised ilmenite was introduced into a rotary furnace together with coke in a ratio of pellets to coke of 1:0.75 by weight and heated at a temperature of 1,140° C. for four hours. After heating for this time, the material was discharged from the furnace and contained titanium dioxide in an amount of 51.41% by weight, a total iron content of 37.48% by weight (expressed as iron oxide) and the metallic iron content of the product from the furnace was 33.84% by weight. The degree of reduction of the iron oxide obtained in this stage was 90.29% by weight.

The reduced ilmenite was then boiled for two hours with waste acid obtained from the sulphate process for the production of titanium dioxide pigment. This acid had a specific gravity of 1.34 at 45° C. and contained 5 grams of $TiO_2$, 75 grams of iron and 266 grams of $H_2SO_4$ per litre. The amount of acid used was 330 millilitres per 200 grams of the reduced ilmenite. After the treatment of the reduced ilmenite with the acid, the product was washed and dried and was analysed. The analysis figures are given below:

|   | Percent by weight |
|---|---|
| $TiO_2$ | 91.50 |
| Niobium (as $Nb_2O_5$) | 0.23 |
| Aluminium (as $Al_2O_3$) | 1.10 |
| Phosphorous (as $P_2O_5$) | 0.20 |
| Manganese (as MnO) | 0.35 |
| Magnesium (as MgO) | 0.85 |
| Silicon (as $SiO_2$) | 0.30 |
| Vanadium (as $V_2O_5$) | 0.16 |
| Chromium (as $Cr_2O_3$) | 0.20 |
| Total iron (as FeO) | 4.30 |

The leached product was then chlorinated. The apparatus used for the chlorination consisted of a silica tube having an outside diameter of 4 inches and a total height of 5 feet. A silica ring was sealed approximately 18 inches from the bottom of the tube inside the tube and this supported a porous disc sealed to the ring. 30 inches above the disc was an overflow outlet and above this was a gas outlet. Into the bottom of the tube and terminating against the underside of the silica ring was a feed tube through which chlorine gas could be introduced into the tube. The exterior surface of the tube between the overflow outlet and the silica disc was positioned in an electric furnace.

The leached product was mixed with coke of a particle size suitable to be fluidised and placed into the tube and supported on the silica disc. Nitrogen was passed through the tube to fluidise the bed of leached product and coke to a depth of 30 inches whilst the temperature of the fluidised bed was raised to 900° C. by means of the electric furnace. The flow of nitrogen was replaced with chlorine and further mixtures of the leached product and coke were added intermittently to the top of the bed at a rate such that the rate of average solids retention time was 45 minutes. The bed solids after chlorination were continuously discharged through the outlet which was provided with a gas seal. The chlorination gases were removed from the top of the bed through the gas outlet, cooled and condensed by conventional means. After chlorination, the beneficiated product had the following analysis:

| | Percent by weight |
|---|---|
| $TiO_2$ | 97.2 |
| Niobium (as $Nb_2O_5$) | 0.21 |
| Aluminium (as $Al_2O_3$) | 0.92 |
| Phosphorous (as $P_2O_5$) | 0.20 |
| Manganese (as MnO) | 0.01 |
| Magnesium (as MgO) | 0.20 |
| Silica (as $SiO_2$) | 0.31 |
| Vanadium (as $V_2O_5$) | 0.08 |
| Chromium (as $Cr_2O_3$) | 0.14 |
| Total iron (as FeO) | 0.60 |

This example illustrates the improvement that is obtained by beneficiating ilmenite ore according to the process of the invention. It will be seen that the product is superior in many respects to mineral rutile currently being used for the production of titanium tetrachloride to be oxidised in a vapour phase oxidation process for the production of titanium dioxide pigments.

EXAMPLE 2

In this experiment a highly weathered ilmenite from Western Australia containing 60.6% $TiO_2$ and a total iron content of 20.4% (calculated as Fe) and having a mean particle size of 170µ was used.

A charge of the ilmenite was fed to a tubular reactor and fluidised with hydrogen. The reactor was maintained at a temperature of 875° C. and the hydrogen flow was continued for half an hour. The resulting product was leached under reflux with constant boiling hydrochloric acid in 20% excess of the total iron content. After washing and drying the leached product was found to contain 89.5% $TiO_2$. The leached product was then chlorinated as in Example 1 to give a final concentrate containing 96.5% $TiO_2$.

What is claimed is:

1. A process for the beneficiation of a titaniferous ore containing a substantial quantity of combined iron present as iron oxide which comprises reducing the iron oxide of the ore to a reduced form capable of being removed by leaching, leaching the treated ore to remove reduced iron oxide, treating the reduced ore at an elevated temperature of from about 800 to about 1100° C. with chlorine gas to form volatile chlorides of substantially all of the iron, the chlorination being carried out for a time such that iron in an amount of about 0.2 to about 1% expressed as iron oxide remains in the reduced ore sufficient to react with substantially all of the titanium tetrachloride which may be formed during the chlorination to produce titanium dioxide whereby the residual iron prevents substantial loss of titanium from the ore, and removing the volatile chlorides so produced from the treated ore.

2. A process according to claim 1 in which the titaniferous ore to be treated has the following general composition:

| | Percent by weight |
|---|---|
| $TiO_2$ | 30–85 |
| Total iron (as oxide) | 10–65 |
| Other ingredients | Balance |

3. A process according to claim 2 in which the titaniferous ore contains from 40 to 70 percent by weight of $TiO_2$ and from 15 to 50 percent by weight of iron as oxide.

4. A process according to claim 1 in which the treated ore after reduction and leaching and prior to chlorination contains from 85 to 95 percent by weight of titanium as $TiO_2$.

5. A process according to claim 1 in which the iron oxide is reduced by heating the ore in the presence of a solid reducing agent.

6. A process according to claim 5 in which the reducing agent is a source of carbon.

7. A process according to claim 1 in which the iron oxide is reduced by heating the ore in the presence of a gaseous reducing agent.

8. A process according to claim 7 in which the reducing agent is hydrogen.

9. A process according to claim 7 in which the reducing agent is carbon monoxide.

10. A process according to claim 1 in which the ore is heated to a temperature of from 800° C. to 1,300° C. to effect the reduction of the iron oxide.

11. A process according to claim 1 in which the reduced ore is treated with an aqueous solution of a leaching agent.

12. A process according to claim 11 in which the reduced ore is treated with an aqueous solution of a mineral acid.

13. A process according to claim 1 in which the reduced ore after leaching is chlorinated with chlorine gas in the presence of a reducing agent.

14. A process according to claim 13 in which the reducing agent is a source of carbon.

References Cited

UNITED STATES PATENTS

| | | | |
|---|---|---|---|
| 1,845,342 | 2/1932 | Saklatwalla | 23—202 |
| 2,441,856 | 5/1948 | Turner et al. | 23—202 |
| 2,747,987 | 5/1956 | Daubenspeck et al. | 75—112 X |
| 2,770,529 | 11/1956 | Anderson et al. | 23—202 |
| 2,912,320 | 11/1959 | Chang | 75—34 |
| 3,216,817 | 11/1965 | Hartford et al. | 75—112 X |
| 3,235,328 | 2/1966 | Lerner et al. | 75—112 X |
| 3,418,074 | 12/1968 | Sargeant | 75—112 X |
| 3,457,037 | 7/1969 | Aramendia et al. | 23—202 |

FOREIGN PATENTS

| | | | |
|---|---|---|---|
| 1,138,948 | 10/1962 | Germany | 75—101 |

ALLEN B. CURTIS, Primary Examiner

U.S. Cl. X.R.

23—202 R; 75—112